United States Patent
Ito et al.

(10) Patent No.: US 10,107,509 B2
(45) Date of Patent: Oct. 23, 2018

(54) SYSTEM AND METHOD FOR CONTROLLING AN OUTDOOR AIR CONDITIONER

(71) Applicant: Mitsubishi Electric Corporation, Tokyo (JP)

(72) Inventors: Shinichi Ito, Suwanee, GA (US); So Nomoto, Suwanee, GA (US); Daisuke Sakai, Suwanee, GA (US)

(73) Assignee: Mitsubishi Electric Corporation, Tokyo (JP)

( * ) Notice: Subject to any disclaimer, the term of this patent is extended or adjusted under 35 U.S.C. 154(b) by 707 days.

(21) Appl. No.: 14/550,191

(22) Filed: Nov. 21, 2014

(65) Prior Publication Data
US 2016/0146480 A1 May 26, 2016

(51) Int. Cl.
| | | |
|---|---|---|
| F24F 3/153 | (2006.01) | |
| F24F 11/30 | (2018.01) | |
| F24F 11/62 | (2018.01) | |
| F24F 11/77 | (2018.01) | |
| F24F 110/10 | (2018.01) | |
| F24F 110/12 | (2018.01) | |
| F24F 120/10 | (2018.01) | |
| F24F 140/60 | (2018.01) | |
| F24F 130/20 | (2018.01) | |

(52) U.S. Cl.
CPC .......... F24F 3/153 (2013.01); F24F 11/30 (2018.01); F24F 11/62 (2018.01); F24F 11/77 (2018.01); *F24F 2110/10* (2018.01); *F24F 2110/12* (2018.01); *F24F 2120/10* (2018.01); *F24F 2130/20* (2018.01); *F24F 2140/60* (2018.01); *Y02B 30/746* (2013.01)

(58) Field of Classification Search
CPC ...... F24F 3/153; F24F 2011/0013; F24F 1/77; F24F 2003/003; F24F 2011/00461; Y02B 30/746

See application file for complete search history.

(56) References Cited

U.S. PATENT DOCUMENTS 5,570,586 A * 11/1996 Maciulewicz ........ F24F 1/0003
 236/51
5,851,309 A * 12/1998 Kousa .................... F24J 2/0444
 126/578

(Continued)

*Primary Examiner* — Len Tran
*Assistant Examiner* — Kamran Tavakoldavani
(74) *Attorney, Agent, or Firm* — Posz Law Group, PLC (57) ABSTRACT

An air conditioning system is provided, including: an outdoor air conditioner, configured to cool outdoor air at an outdoor temperature into dehumidified air at a dehumidified temperature, to heat the dehumidified air into supply air at a supply air temperature, and to provide the supply air to a plurality of rooms; a plurality of indoor air conditioners provided inside the plurality of rooms, respectively, each indoor air conditioner being configured to draw in input air at an input temperature, to heat or cool the input air into output air at an output temperature, and to provide the output air to a corresponding room; a control circuit configured to determine whether an air conditioning load exists in a set number of the plurality of rooms, and to adjust operation of the outdoor air conditioner to set the supply air temperature based on whether the air conditioning load is determined to exist.

22 Claims, 7 Drawing Sheets

(56) References Cited

U.S. PATENT DOCUMENTS

| | | | |
|---|---|---|---|
| 7,024,283 B2* | 4/2006 | Bicknell | G05D 23/1931 165/200 |
| 7,827,813 B2 | 11/2010 | Seem | |
| 9,752,791 B2* | 9/2017 | Mori | F24F 3/065 |
| 2008/0110187 A1 | 5/2008 | Han et al. | |
| 2011/0253796 A1* | 10/2011 | Posa | F24F 11/0034 236/49.3 |
| 2012/0085112 A1* | 4/2012 | Wintemute | F24F 3/147 62/150 |
| 2012/0125030 A1* | 5/2012 | Kim | F25B 39/00 62/238.6 |
| 2013/0085613 A1 | 4/2013 | Bester et al. | |
| 2013/0253727 A1* | 9/2013 | Kimura | G05D 23/1919 700/300 |
| 2014/0318165 A1* | 10/2014 | Kanazawa | F25B 39/00 62/238.6 |

\* cited by examiner

SYSTEM AND METHOD FOR CONTROLLING AN OUTDOOR AIR CONDITIONER

FIELD OF THE INVENTION

The present invention relates generally to air conditioning systems that include an outside air conditioning unit and one or more indoor air conditioning units. More particularly, the present invention relates to a system and method for controlling the degree to which air is heated by an outdoor air conditioning unit in such a system.

BACKGROUND OF THE INVENTION

In many conventional air-conditioning systems, the system includes an outdoor air conditioning unit (OACU) and one or more indoor air conditioning units (IACUs) in one or more rooms of a structure, respectively. The outdoor air conditioning unit provides supply air at a base temperature, while the individual IACUs refine the temperature of the air in the individual rooms to achieve a desired air temperature.

In addition to heating and cooling air, many air conditioning systems also operate to remove humidity from the air they provide. This is generally done by cooling the outdoor air down to the dew point (55° F.) in the OACU, at which point moisture will condense out of the air.

Since 55° F. is typically colder than the temperature most users desire for their air, air conditioning systems that remove humidity from the air also typically have a heater such that the dehumidified air can be reheated at the OACU before it is provided to the individual rooms in the structure at the base temperature. Typically, the base temperature of supply air is approximately the desired temperature for the room or rooms. In other words, in an ideal circumstance, the OACU would perform all of the work, providing air at the desired temperature.

However, the individual rooms can often have an air conditioning load associated with them. This air conditioning load represents an amount of heating or cooling that must be performed on the supply air to bring the air in the room to the desired temperature (i.e., the temperature set by an occupant of the room). For example, if a room is full of people, that will tend to raise the temperature in that room. If the base temperature of the supply air is approximately the desired temperature, then the people in the room will raise the room's temperature, requiring an associated IACU to cool the air. Likewise, if the temperature outside the room, or outside the structure, is significantly different than the desired temperature in the room, this may cause the temperature in the room to move away from the base temperature of the supply air, again requiring an IACU to heat or cool the air so that it can reach the desired temperature.

In situations in which the air is dehumidified and the air conditioning load in a room requires an IACU to cool the air, this may result in the OACU heating the air, while one or more IACUs cool the air. This is a waste of energy, since the OACU and the IACU are working at cross purposes.

It would therefore be desirable to have an air conditioning system in which the heating of air by an OACU was regulated so as to minimize the total power expended by the OACU and any associated IACUs.

SUMMARY

An air conditioning system, including: an outdoor air conditioner provided outside a structure, configured to cool outdoor air at an outdoor temperature into dehumidified air at a dehumidified temperature, configured to heat the dehumidified air to a supply air temperature, and configured to provide the dehumidified air as supply air to a plurality of air-conditioning spaces inside the structure; a plurality of indoor air conditioners provided inside the plurality of air-conditioning spaces, respectively, each of the plurality of indoor air conditioners being configured to draw in input air at an input temperature, configured to heat or cool the input air to an output temperature, and configured to provide the input air as output air to a corresponding air-conditioning space; and a control circuit configured to determine whether an air conditioning load exists in a set number of the plurality of air-conditioning spaces, and to adjust operation of the outdoor air conditioner to set the supply air temperature based on whether the air conditioning load is determined to exist in the set number of the plurality of air-conditioning spaces.

The control circuit may be further configured to set the supply air temperature to either a maximum temperature or an adjusted temperature.

The adjusted temperature may be the dehumidification temperature.

The plurality of desired temperatures may be set for the plurality of air-conditioning spaces, respectively, and the adjusted temperature may be a highest temperature of the plurality of desired temperatures.

The plurality of desired temperatures may be set for the plurality of air-conditioning spaces, respectively, and the adjusted temperature may be a highest temperature of the plurality of desired temperatures modified by an adjustment value.

The plurality of desired temperatures may be set for the plurality of air-conditioning spaces, respectively, and the adjusted temperature may be an average temperature of the plurality of desired temperatures.

The plurality of desired temperatures may be set for the plurality of air-conditioning spaces, respectively, and the adjusted temperature may be an average temperature of the plurality of desired temperatures modified by an adjustment value.

The adjusted temperature may be a highest temperature of the plurality of output temperatures.

The set number of the plurality of indoor air conditioners may be one of the plurality of indoor air conditioners.

The set number of the plurality of indoor air conditioners may be all of the plurality of indoor air conditioners.

The input air may be the supply air, and the output air may be indoor air. Alternately, the input air may be indoor air from the indoor air-conditioning space, and the output air maybe conditioned indoor air.

The control circuit may further comprise an indoor air conditioner operation sensor configured to determine whether the set number of the indoor air conditioners are currently operating, and the control circuit may be further configured to determine whether the air conditioning load exists based on whether the indoor air conditioner operation sensor determines that the set number of the indoor air conditioners are currently operating.

The control circuit may further comprise a solar radiation sensor configured to detect an amount of solar radiation incident on the structure, and the control circuit may be further configured to determine whether the air conditioning load exists based on whether the detected amount of solar radiation exceeds a solar radiation threshold.

The control circuit may further comprise an energy consumption sensor configured to detect an energy consumption of the air conditioning system, and the control circuit may be further configured to determine whether the air conditioning load exists based on whether the detected energy consumption exceeds an energy consumption threshold.

The control circuit may further comprise a clock configured to determine a current time of day, and the control circuit may be further configured to determine whether the air conditioning load exists based on whether the current time of day falls within a set time range.

The control circuit may further comprise a calendar circuit configured to determine a current date, and the control circuit may be further configured to determine whether the air conditioning load exists based on whether the current date falls within a set date range.

The control circuit may further comprise an outdoor temperature sensor configured to detect the outdoor temperature, and the control circuit may be further configured to determine whether the air conditioning load exists based on whether the outdoor temperature is above an outdoor temperature threshold.

A method is provided of controlling an outdoor air conditioner formed outside of a structure, the method including: drawing outdoor air at an outdoor temperature into the outdoor air conditioner; cooling the outdoor air to a dehumidification temperature to provide dehumidified air in the outdoor air conditioner; determining a plurality of desired temperatures for a plurality of air-conditioning spaces in the structure, respectively; detecting a plurality of conditioned air temperatures of output air provided by a plurality of indoor air conditioners associated with the plurality of air-conditioning spaces, respectively; setting a supply air temperature based on at least one of the plurality of desired temperatures and the plurality of conditioned air temperatures; determining whether an air conditioning load exists in a set number of the plurality of air-conditioning spaces; increasing the supply air temperature by a temperature increment, to no higher than a maximum temperature, if an air conditioning load does not exist; decreasing the supply air temperature by the temperature increment, to no lower than a minimum temperature, if an air conditioning load does exist; heating the dehumidified air to generate supply air at the supply air temperature; providing the supply air to the plurality of air-conditioning spaces; and continually repeating the operations of drawing outdoor air, cooling the outdoor air, determining a plurality of desired temperatures, detecting a plurality of conditioned air temperatures, determining whether an air conditioning load exists, increasing the supply air temperature by the temperature increment if an air conditioning load does not exist, decreasing the supply air temperature by the temperature increment if an air conditioning load does exist, heating the dehumidified air, and providing the supply air to the plurality of rooms.

BRIEF DESCRIPTION OF THE DRAWINGS

The accompanying figures where like reference numerals refer to identical or functionally similar elements and which together with the detailed description below are incorporated in and form part of the specification, serve to further illustrate an exemplary embodiment and to explain various principles and advantages in accordance with the present invention.

DETAILED DESCRIPTION

The instant disclosure is provided to further explain in an enabling fashion the best modes of performing one or more embodiments of the present invention. The disclosure is further offered to enhance an understanding and appreciation for the inventive principles and advantages thereof, rather than to limit in any manner the invention. The invention is defined solely by the appended claims including any amendments made during the pendency of this application and all equivalents of those claims as issued.

It is further understood that the use of relational terms such as first and second, and the like, if any, are used solely to distinguish one from another entity, item, or action without necessarily requiring or implying any actual such relationship or order between such entities, items or actions. Likewise, the use of positional terms such as front, back, side, top, and bottom are used solely to provide a reference point for one particular orientation, and to enhance clarity. Their use does not imply that such an orientation is required. In operation, the disclosed air handling units can be used in any desired orientation.

Air Conditioning System

Figure 1:
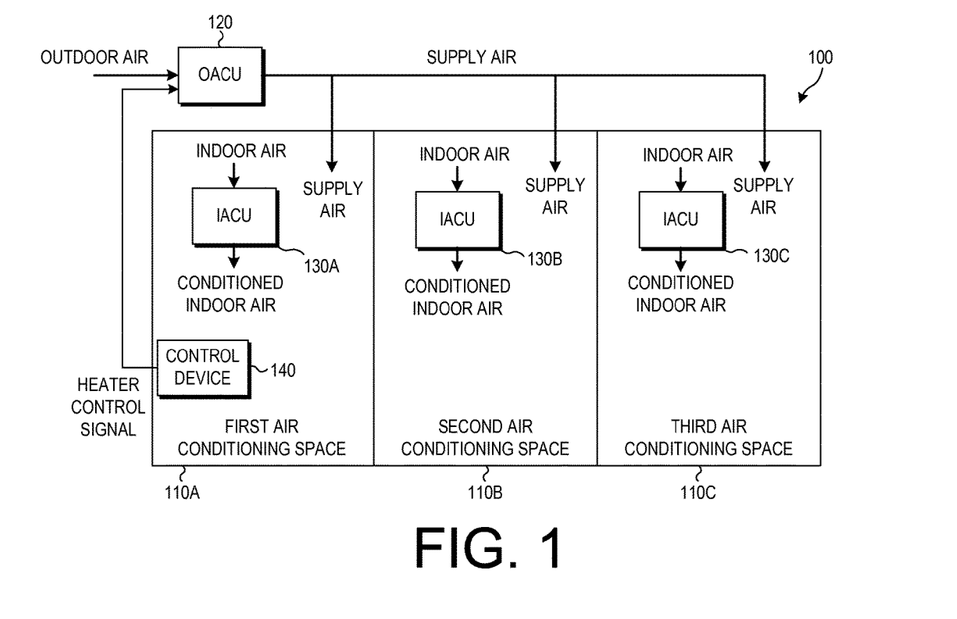
FIG. 1 is a block diagram of an air conditioning system according to a disclosed embodiment.

FIG. 1 is a block diagram of an air conditioning system 100 according to a disclosed embodiment. As shown in FIG. 1, the air-conditioning system 100 includes a plurality of air-conditioning spaces 110A-110C, an outdoor air conditioning unit (OACU) 120, a plurality of indoor air conditioning units (IACU) 130A-130C, each associated with a respective air-conditioning space 110A-110C, and a control device 140.

The plurality of air-conditioning spaces 110A-110C are all indoor spaces that need to be cooled or heated with respect to an outdoor temperature $T_O$. Each air-conditioning space 110A-110C must be heated to a respective desired target temperature $T_{T-A}$, $T_{T-B}$, $T_{T-C}$. These can be the same target temperature or different target temperatures in various embodiments. For simplicity of disclosure, the desired target temperatures $T_{T-A}$, $T_{T-B}$, $T_{T-C}$ will be collectively referred to as the desired target temperatures $T_T$, or the desired target temperature $T_T$. It should be understood that when the disclosure refers to a target temperature $T_T$, this is the target temperature for an individual air-conditioning space, and that the target temperatures $T_T$ for different air-conditioning spaces may vary in some embodiments.

The air-conditioning spaces 110A-110C can be individual rooms in a structure, groups of rooms in the structure, or any indoor space that needs to have its temperature controlled. For simplicity of disclosure, the plurality of air-conditioning spaces 110A-110C will be collectively referred to as air-conditioning spaces 110, or just an air conditioning space 110. Furthermore, although FIG. 1 discloses three air-conditioning spaces 110, this is by way of example only. Alternate embodiments could have more or fewer air-conditioning spaces 110, as needed.

The OACU 120 operates to take outside air at an outside temperature $T_O$, and condition it to form supply air at a supply air temperature $T_S$, which is provided to each of the air-conditioning spaces 110. The OACU 120 can either heat or cool the outdoor air, as required to gain a desired target temperature $T_T$ in each of the air-conditioning spaces 110. In particular, the OACU 120 includes both a heat exchanger that can both heat or cool the outside air, and a heater that can heat air conditioned by the heat exchanger.

The plurality of IACUs 130A-130C are each associated with a respective air-conditioning space 110A-110C. for ease of disclosure, the plurality of IACUs 130A-130C will be referred to generically as an IACU 130, or IACUs 130.

Each IACU 130 operates to maintain its corresponding air-conditioning space 110 at a desired target temperature $T_T$. Ideally, the supply air provided by the OACU 120 will maintain each air-conditioning space 110 at its desired target temperature $T_T$. However, in many circumstances this will not be the case. This is particularly true if each air-conditioning space 110 is set to a different desired target temperature $T_T$. In such circumstances, the IACU 130 in a given air-conditioning space 110 will condition the indoor air into conditioned indoor air that will operate to maintain the air-conditioning space 110 at its desired target temperature $T_T$.

In particular, if the supply air temperature $T_S$ is below what is required to maintain the desired target temperature $T_T$ for a given air-conditioning space 110 (i.e., the supply air is too cold), the IACU 130 will heat the indoor air to provide conditioned indoor air that is warm enough to maintain the desired target temperature $T_T$ for the air-conditioning space 110. Likewise, if the supply air temperature $T_S$ is above what is required to maintain the desired target temperature $T_T$ for a given air-conditioning space 110 (i.e. the supply air is too warm), the IACU 130 will cool the indoor air to provide conditioned indoor air that is cool enough to maintain the desired target temperature $T_T$ for the air-conditioning space 110.

The control device 140 determines whether an air conditioning load exists within each of the air-conditioning spaces 110, and uses this information to control the operation of the heater in the OACU 120, as set forth below. In some embodiments, the control device 140 may also control the general operation of the OACU 120 and the IACUs 130.

Although in FIG. 1, the control device 140 is shown as being in the first air-conditioning space, portions of the control device 140 would also be present in the second air-conditioning space and the third air-conditioning space. In particular, certain sensors connected to the control device 140 would be present in each air-conditioning space.

In the embodiment of FIG. 1, the desired target temperature $T_T$ for each air-conditioning space is set at the control device. In embodiments in which a different target temperature $T_T$ is allowed for each air-conditioning space, these different target temperatures $T_T$ can be set at a central control device 140 or at individual connected control devices 140 in each air-conditioning space 110.

Outside Air Conditioning Unit

Figure 2:
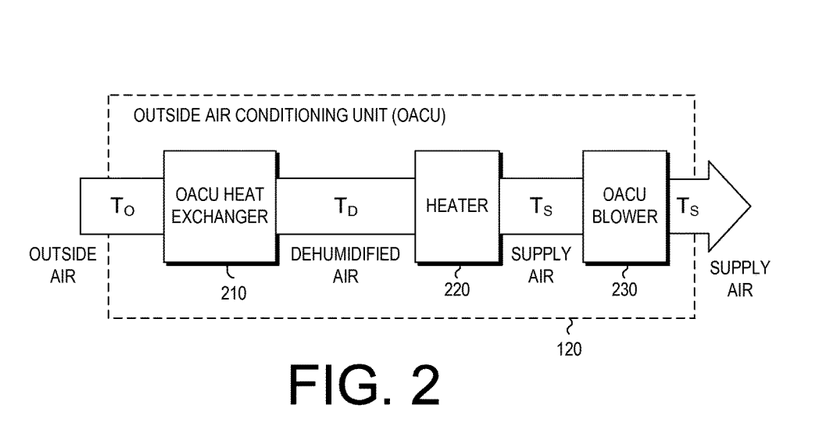
FIG. 2 is a block diagram of the outside air conditioning unit of FIG. 1 according to a disclosed embodiment.

FIG. 2 is a block diagram of the outside air conditioning unit (OACU) 120 of FIG. 1 according to a disclosed embodiment. As shown in FIG. 2, the OACU 120, acting as an outside air conditioner, includes an OACU heat exchanger 210, a heater 220, and an OACU blower 230.

The OACU heat exchanger 210 receives outside air at an outside air temperature $T_O$, and heats it or cools it, as needed. In some situations, the outside air will be both hot and humid, requiring the OACU heat exchanger 210 to first cool the air to a dehumidified temperature $T_D$, generating dehumidified air in order to remove moisture from the air being processed. In the disclosed embodiment, the dehumidification temperature $T_D$ is 55° F. However any temperature at which water condenses out of air is suitable as a dehumidification temperature.

In the disclosed embodiment, the OACU heat exchanger 210 is a heat-exchanging coil. However, alternate embodiments could employ any element capable of heating and cooling air as an OACU heat exchanger 210.

The heater 220 operates to heat the dehumidified air to an air supply temperature $T_S$. This air supply temperature $T_S$ is the temperature of the supply air that is supplied to the room or rooms in the structure to which the OACU is attached. This supply temperature $T_S$ is controlled by the control module 140, and is varied between the dehumidification temperature $T_D$ and a maximum temperature based on how much the dehumidified air is heated by the heater 220.

The heater 220 may not have to operate in some situations. For example the heater will not operate when the dehumidified air is passed directly as supply air. In this case, the heater can be turned off for as long as the dehumidified air is being passed as supply air.

The OACU blower 230 operates to draw air through the OACU heat exchanger 210 and the heater 220, and to provide conditioned air to the room or rooms in the structure associated with the OACU 120. In the disclosed embodiment, the OACU blower 230 is located after the heater 220 in the airflow through the OACU 120. Thus, the OACU draws air through the OACU heat exchanger 210 to the heater 220, and through the OACU blower 230, and then to the room or rooms in the structure.

Although FIG. 2 shows the OACU blower 230 as being located after the heater 220 in the airflow of the OACU 120, this is by way of example only. The OACU blower 230 can be located at any part along the passage of the air through the OACU 120. For example the OACU blower 230 could be located between the OACU heat exchanger 210 and the heater 220. In this case, it would pass the dehumidified air from the OACU heat exchanger 210 to the heater 220. Likewise, the OACU blower 230 could be located before the OACU heat exchanger 210. In this case, it would pass outside air from outside of the OACU 120 to the OACU heat exchanger 210.

Inside Air Conditioning Unit

Figure 3:
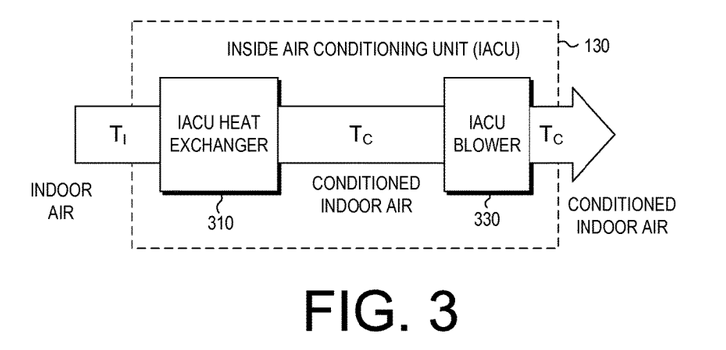
FIG. 3 is a block diagram of an inside air conditioning unit of FIG. 1 according to a disclosed embodiment.

FIG. 3 is a block diagram of an inside air conditioning unit (IACU) 130 of FIG. 1 according to a disclosed embodiment.

As shown in FIG. 3, the IACU 130, acting as an indoor air conditioner, includes an IACU heat exchanger 310 and an IACU blower 330.

Each IACU 130 operates to adjust the temperature of the air in a given room of the structure associated with the OACU 120. As noted above, the OACU 120 will provide supply air at an air supply temperature $T_S$. Ideally, the supply air temperature $T_S$ will be the exact temperature required for a given room. However, if this is not the case, the IACU 130 associated with that room will operate to raise or lower the temperature of the air in that room until it is at a temperature that will maintain the desired target temperature $T_T$ for the room.

The IACU heat exchanger 310 receives indoor air from inside an air conditioning space 110, and either heats or cools this indoor air to a conditioned temperature $T_C$ to generate conditioned indoor air. The conditioned temperature $T_C$ is set to maintain the room at the desired target temperature $T_T$.

In the disclosed embodiment, the IACU heat exchanger 310 is a heat-exchanging coil. However, alternate embodiments could employ any element capable of heating and cooling air as an IACU heat exchanger 310.

The IACU blower 330 operates to draw air through the IACU heat exchanger 310, and to provide conditioned air to the room in the structure associated with the IACU 130. In the disclosed embodiment, the IACU blower 330 is located after the IACU heat exchanger 310 in the airflow through the IACU 130. Thus, the IACU 130 draws air through the IACU heat exchanger 310, through the IACU blower 330, and then to the room.

Although FIG. 3 shows the IACU blower 330 as being located after the IACU heat exchanger 310 in the airflow of the IACU 130, this is by way of example only. The IACU blower 330 can be located either before or after the IACU heat exchanger 310.

Control Module

Figure 4:
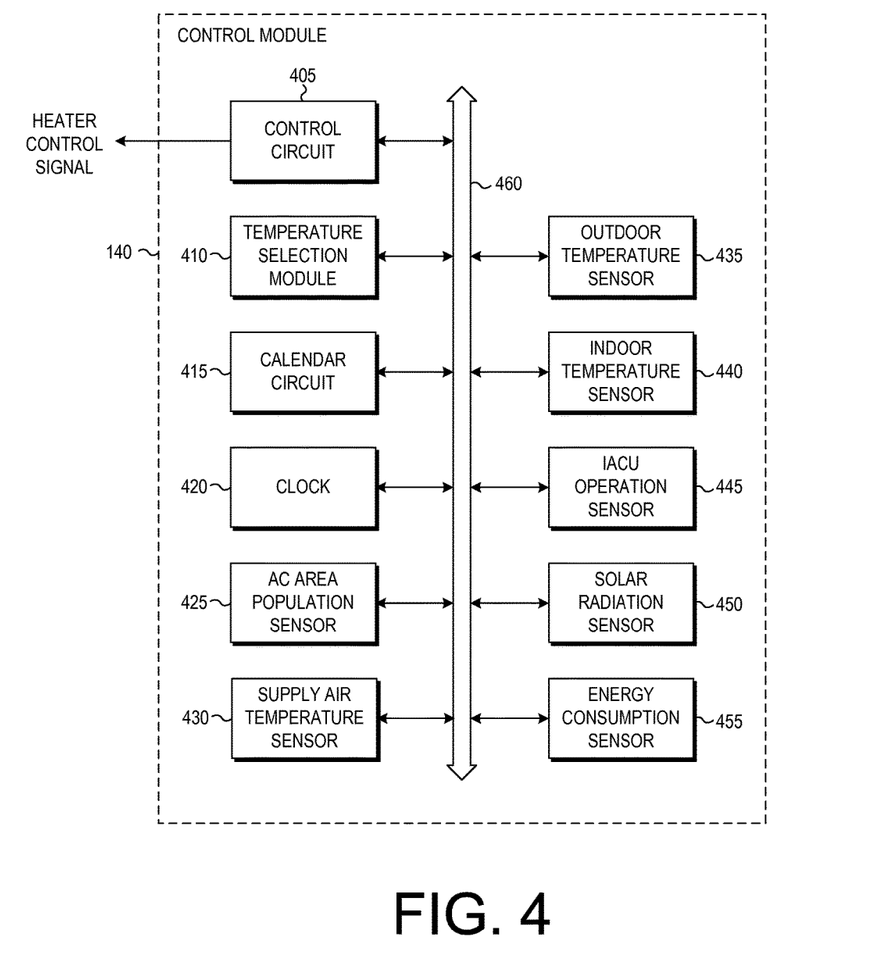
FIG. 4 is a block diagram of the control module of FIG. 1 according to a disclosed embodiment.

FIG. 4 is a block diagram of the control module 140 of FIG. 1 according to a disclosed embodiment. As shown in FIG. 4, the control module 140 includes a control circuit 405, a temperature selection module 410, a calendar circuit 415, a clock 420, an air conditioning area population sensor 425, a supply air temperature sensor 430, an outdoor temperature sensor 435, an indoor temperature sensor 440, an IACU operation sensor 445, a solar radiation sensor 450, an energy consumption sensor 455, and a bus 460.

The control circuit 405 controls at least certain aspects of the operation of the OACU 120 and may control some aspects of the operation of the IACUs 130. In particular, the control circuit 405 generates a heater control signal that controls the operation of the heater 220 in the OACU 120. The heater control signal tells the heater 220 when to turn on and when to turn off.

The control circuit 405 generates the heater control signal based on information received from the temperature selection module 410, the calendar circuit 415, the clock 420, the air conditioning area population sensor 425, the supply air temperature sensor 430, the outdoor temperature sensor 435, the indoor temperature sensor 440, the IACU operation sensor 445, the solar radiation sensor 450, and the energy consumption sensor 455.

The temperature selection module 410 sets a target temperature $T_T$ for each air-conditioning space 110 in the structure associated with the OACU 120, and provides the target temperature $T_T$ to the control circuit 405 via the bus 460. Typically, these target temperatures $T_T$ are set by a resident of the air-conditioning space 110, though in some embodiments they can be set by an administrator.

In some embodiments, the temperature selection module 410 will set the same temperature for all of the air-conditioning spaces 110 in the structure; in other embodiments, the temperature selection module 410 can select a different temperature for each air-conditioning space 110. Furthermore, in some embodiments the target temperature $T_T$ for each air-conditioning space 110 will be set at a central location, e.g., the control module 140. However, alternate embodiments can allow the target temperature $T_T$ for each air-conditioning space 110 to be set via a thermostat located in each corresponding air-conditioning space 110. In this case, each of the thermostats will connect to the temperature selection module 410 to identify the target temperature $T_T$ for that air-conditioning space 110.

The calendar circuit 415 monitors the current date, and provides that date to the control circuit 405 via the bus 460.

The clock 420 monitors the current time, and provides that time to the control circuit 405 via the bus 460.

The air-conditioning space population sensor 425 detects an actual or approximate number of people in one or more air-conditioning spaces 110 of the structure, and provides that value to the control circuit 405 via the bus 460. Since it is necessary to perform detection operations in each air-conditioning space 110, a portion of the room population sensor 425 will be located in each air-conditioning space 110. Once the population numbers have been determined, each air-conditioning space 110 will communicate with the portion of the air-conditioning space population sensor 425 located in the control module 140.

The supply air temperature sensor 430 detects the actual supply temperature $T_S$ of the supply air provided by the OACU 122 each of the air-conditioning spaces 110 in the structure associated with the OACU 120. The supply air temperature sensor 430 provides this value of the actual supply temperature $T_S$ to the control circuit 405 via the bus 460.

The outdoor temperature sensor 435 detects the outdoor temperature $T_O$ of the air outside the structure to which the OACU 120 is attached, and communicates that outdoor temperature value to the control circuit 405 via the bus 460.

The indoor temperature sensor 440 detects the actual indoor temperature $T_I$ in each of the air-conditioning spaces 110 in the structure, and provides these indoor temperature values to the control circuit 405 via the bus 460. These actual indoor temperatures $T_I$ can be compared with the desired target temperatures $T_T$ for the air-conditioning spaces 110 to help the control circuit 405 generate the heater control signal.

The IACU operation sensor 445 detects whether any of the IACUs 130 are in operation, i.e., heating or cooling their respective air-conditioning spaces 110, and if so which of the IACUs 130 are in operation. This can serve as an indication as to whether there is an air conditioning load in a given air-conditioning space 110. The IACU operation sensor 445 provides the information regarding which, if any, IACUs 130 are in operation to the control circuit 405 via the bus 460.

The solar radiation sensor 450 operates to detect an amount of solar radiation incident upon the structure to which the OACU 120 is connected, or incident upon a particular air-conditioning space 110 within the structure. Solar radiation is an indirect measurement of the air conditioning load imposed on the room or rooms in the structure by the heat of the sun. The solar radiation sensor 450 provides the detected amount of solar radiation to the control circuit 405 via the bus 460.

The energy consumption sensor 455 operates to detect the energy consumption of the OACU 120, and all IACUs 130 associated with the OACU 120. In this way, the energy consumption sensor 455 can detect the energy consumption for the entire air-conditioning system 100. The energy consumption sensor 455 provides the total energy consumption value to the control circuit 405 via the bus 460.

The bus 460 is connected to the other elements of the control module 140, and serves to facilitate communication between these elements. In particular it allows the temperature selection module 410, the calendar circuit 415, the clock 420, the air conditioning area population sensor 425, the supply air temperature sensor 430, the outdoor temperature sensor 435, the indoor temperature sensor 440, the IACU operation sensor 445, the solar radiation sensor 450, and the energy consumption sensor 455 to provide data to the control circuit 405.

Although a bus 460 is shown connecting the various elements of the control module 140, this is by way of example only. Alternate embodiments could have the various elements of the control module 140 directly connected to the control circuit 405. Other embodiments could have some sensors connected to the control circuit 405 via the bus 460, and others directly connected to the control circuit 405.

Figure 6:
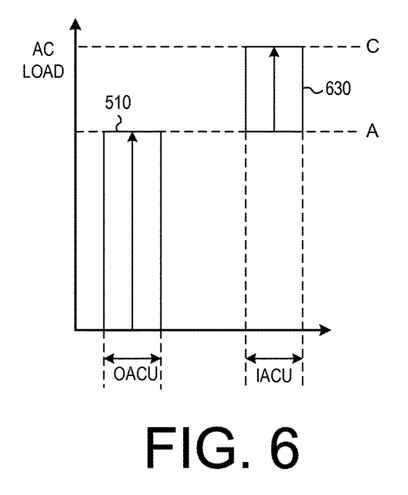
FIG. 6 is a graph of the load of the outside air conditioning unit and the inside air conditioning unit of FIG. 1 according to another disclosed embodiment.

In addition, although the control module 140 of FIG. 6 shows a cooling multiple sensors, alternate embodiments could have more or fewer sensors. Such embodiments may use more or less information to generate a heater control signal.

Air Conditioning Loads

In a cooling operation on hot and humid air, the OACU 120 draws in the outdoor air at an outdoor temperature $T_O$, cools the outdoor air down to a dehumidification temperature $T_D$ in order to remove moisture from it, and then heats the dehumidified air up to a supply air temperature $T_S$, at which point the air is provided to the air-conditioning spaces 110 of the structure associated with the OACU 120 as supply air.

Once the supply air is supplied to an air-conditioning space 110, it must then overcome an air conditioning load in that air-conditioning space 110 in order to keep the air-conditioning space 110 at a desired target temperature $T_T$. The air conditioning load in the air-conditioning space 110 represents something that will keep the air-conditioning space 110 away from its desired target temperature $T_T$, and so will require additional energy to move the temperature of the air back to the desired target temperature $T_T$. If the air-conditioning space 110 is being cooled, for example, the air conditioning load in that air-conditioning space 110 would be caused by anything that would tend to warm the air-conditioning space 110 below its desired target temperature $T_T$. Some examples of this are having a large number of people in the air-conditioning space 110, whose body heat can raise the temperature of the air-conditioning space 110, having a high outdoor temperature, which can warm the structure in general, making it more difficult to keep the air-conditioning space 110 cool, or having a large amount of sunlight (i.e., solar radiation) incident on the structure, which can warm the structure, again making it more difficult to keep the air-conditioning space 110 cool.

Consider an example in which the supply air temperature $T_S$ was 72° F., and the desired target temperature $T_T$ for an air-conditioning space 110 was also 72° F. If it was a moderate day, with little sunlight incident on the structure, and no one was in the air-conditioning space 110, there might be little or no air conditioning load in the air-conditioning space 110. In such case, the supply air would be sufficient to keep the air-conditioning space 110 at the desired target temperature $T_T$, and the IACU 130 associated with the air-conditioning space 110 could remain off.

However, if it was a very warm day, with a large amount of sunlight incident on the structure, and a large number of people in the air-conditioning space 110, there would be a number of heat sources that could tend to raise the temperature in the air-conditioning space 110. In such case, the 72° F. supply air would be warmed by the various sources of heat, making the actual temperature of the air-conditioning space 110 higher than 72° F. In order to keep the temperature at its desired target temperature $T_T$, the IACU 130 associated with the air-conditioning space 110 would have to turn on in order to cool the air in the room to the desired target temperature $T_T$.

Figure 5:
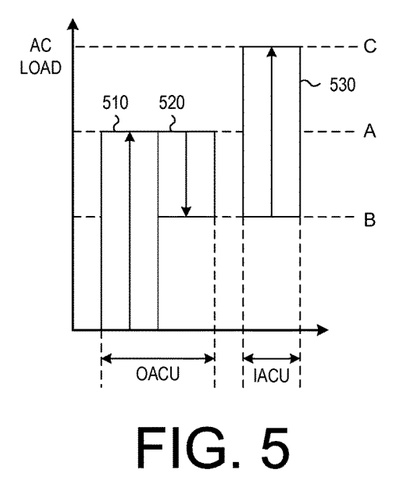
FIG. 5 is a graph of the load of the outside air conditioning unit and the inside air conditioning unit of FIG. 1 according to a disclosed embodiment.

FIG. 5 is a graph of the load of the outside air conditioning unit (OACU) 120 and an inside air conditioning unit (IACU) 130 of FIG. 1 according to a disclosed embodiment. In this embodiment the outside air is warm and humid, requiring dehumidification, and there is an air conditioning load in the air-conditioning space 110 associated with the IACU 130. For the sake of simplicity, this graph will consider the case of controlling the temperature in a single air-conditioning space 110 with a single IACU 130 in the structure associated with the OACU 120. However, it can easily be extended to address the total load in multiple air-conditioning spaces 110 in a structure.

As shown in FIG. 5, the OACU 120 has a first cooling air conditioning load 510 and a first heating air conditioning load 520, while the IACU 130 has a second cooling air conditioning load 530. In this graph, loads with an arrow pointing up represent cooling air conditioning loads, while loads with an arrow pointing down represent heating air conditioning loads.

The first cooling air conditioning load 510 represents the energy A required for the OACU 120 to cool outdoor air from an outdoor temperature $T_O$ to a dehumidified temperature $T_D$.

The first heating air conditioning load 520 represents the energy (A−B) required for the OACU 120 to heat the dehumidified air from the dehumidified temperature $T_D$ to a supply air temperature $T_S$ that is close to the desired target temperature $T_T$ of the air-conditioning space 110.

The second cooling air conditioning load 530 represents the energy (C−B) required for the IACU 130 to overcome the air conditioning load in the air-conditioning space 110 associated with the IACU 130.

The total amount of energy expended by the OACU 120 and the IACU 130 is represented by the total volume of the first and second cooling loads 510, 530 and the first heating load 520, i.e., A+(A−B)+(C−B)=C+2(A−B). As shown in FIG. 5, however, energy (A−B) is being expended twice, once to heat the air after being dehumidified and once to cool the air after it is heated. This is wasted energy, which should be minimized. Ideally, the dehumidified air should only be heated as much as necessary to obtain a desired target temperature $T_T$ in the air-conditioning space 110.

FIG. 6 is a graph of the load of the outside air conditioning unit (OACU) 120 and an inside air conditioning unit (IACU) 130 of FIG. 1 according to another disclosed embodiment. In this embodiment the outside air is warm and humid, requiring dehumidification, and there is an air conditioning load in the air-conditioning space 110 associated with the IACU 130. As with FIG. 5, for the sake of simplicity, this graph will consider the case of controlling the temperature in a single air-conditioning space 110 with a single IACU 130 in the structure associated with the OACU 120. However, it can easily be extended to address the total load in multiple air-conditioning spaces 110 in a structure.

As shown in FIG. 6, the OACU 120 has a first cooling air conditioning load 510, while the IACU 130 has a third cooling air conditioning load 630. As with FIG. 5, loads with an arrow pointing up represent cooling air conditioning loads. The embodiment of FIG. 6 has no heating load, meaning that the dehumidified air is not heated at all, but is provided as the supply air.

As in FIG. 5, the first cooling air conditioning load 510 represents the energy A required for the OACU 120 to cool outdoor air from an outdoor temperature $T_O$ to a dehumidified temperature $T_D$. This dehumidified air at the dehumidified temperature $T_D$ is provided directly to the air-conditioning space 110 as supply air. In other words, the supply air temperature $T_S$ is equal to the dehumidified temperature $T_D$.

In this embodiment, however, the temperature required to maintain the air-conditioning space 110 at a desired target temperature $T_T$ is lower than the dehumidification temperature $T_D$. As a result, the IACU 130 must operate to further cool the indoor air to maintain the desired target temperature $T_T$.

The third cooling air conditioning load 630 represents the energy (C−A) required for the IACU 130 to cool the indoor air to keep it at the desired target temperature $T_T$.

In this embodiment, the air conditioning load of the air-conditioning space 110 is sufficiently high that even if the supply air is provided at the dehumidified temperature $T_D$, it is still not sufficiently cold to maintain the air-conditioning space 110 at the desired target temperature $T_T$. Therefore, the IACU 130 must further cool the air to keep it at the desired target temperature $T_T$.

Consider, for example, if the dehumidified temperature $T_D$ is 55° F., and the desired target temperature $T_T$ is 72° F. In this example, the air conditioning load in the air-conditioning space 110 is sufficiently high that even if supply air is provided to the air-conditioning space 110 at 55° F., the sources of heat operating on the air-conditioning space 110 are sufficient that the temperature of the air-conditioning space 110 will be above 72° F. As a result, the IACU 130 must operate to further cool the air in the air-conditioning space 110 to keep it at 72° F.

The total amount of energy expended by the OACU 120 and the IACU 130 is represented by the total volume of the first and third cooling loads 510, 630, i.e., A+(C−A)=C. As shown in FIG. 6, no energy is lost in needlessly heating the dehumidified air, since the air conditioning load in the air-conditioning space 110 is so high that even supply air at the dehumidified temperature $T_D$ will not keep the air-conditioning space 110 at its desired target temperature $T_T$. However, in this embodiment the air-conditioning system 100 expends the minimum amount of energy to cool the supply air to a desired target temperature $T_T$.

Figure 7:
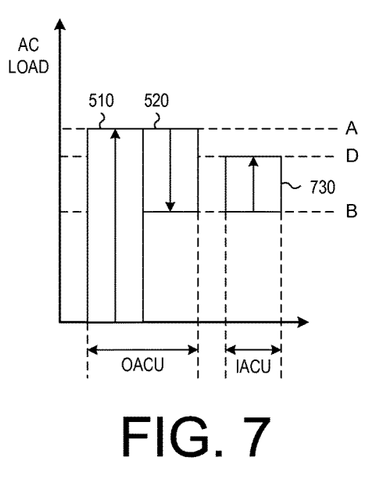
FIG. 7 is a graph of the load of the outside air conditioning unit and an inside air conditioning unit of FIG. 1 according to yet a disclosed embodiment.

FIG. 7 is a graph of the load of the outside air conditioning unit (OACU) 120 and an inside air conditioning unit (IACU) 130 of FIG. 1 according to yet another disclosed embodiment.

In this embodiment the outside air is warm and humid, requiring dehumidification, and there is an air conditioning load in the air-conditioning space 110 associated with the IACU 130. As with FIG. 5, for the sake of simplicity, this graph will consider the case of controlling the temperature in a single air-conditioning space 110 with a single IACU 130 in the structure associated with the OACU 120. However, it can easily be extended to address the total load in multiple air-conditioning spaces 110 in a structure.

As shown in FIG. 7, the OACU 120 has a first cooling air conditioning load 510 and a first heating air conditioning load 520, while the IACU 130 has a fourth cooling air conditioning load 730. As with FIG. 5, loads with an arrow pointing up represent cooling air conditioning loads, while loads with an arrow pointing down represent heating air conditioning loads.

As in FIG. 5, the first cooling air conditioning load 510 represents the energy A required for the OACU 120 to cool outdoor air from an outdoor temperature $T_O$ to a dehumidified temperature $T_D$. This dehumidified air at the dehumidified temperature $T_D$ is provided directly to the air-conditioning space 110 as supply air. In other words the supply air temperature $T_S$ is equal to the dehumidified temperature $T_D$.

In this embodiment, the temperature required to maintain the air-conditioning space 110 at a desired target temperature $T_T$ is higher than the dehumidification temperature $T_D$. As a result, the dehumidified air must be heated to provide indoor air that can maintain the desired target temperature $T_T$.

The first heating air conditioning load 520 represents the energy (A−B) required for the OACU 120 to heat the dehumidified air from the dehumidified temperature $T_D$ to a supply air temperature $T_S$ that is close to the desired target temperature $T_T$ of the air-conditioning space 110. However, because of environmental conditions in the air-conditioning space 110 the indoor air will be too warm if the supply air temperature $T_S$ is equal to the desired target temperature $T_T$.

The fourth cooling air conditioning load 730 represents the energy (D−B) required for the IACU 130 to cool the indoor air to keep it at the desired target temperature $T_T$.

Consider, for example, if the dehumidified temperature $T_D$ is 55° F., and the desired target temperature $T_T$ is 72° F. In this example, the air conditioning load in the air-conditioning space 110 is high enough that if supply air is provided to the air-conditioning space 110 at 72° F., the sources of heat operating on the air-conditioning space 110 will raise the temperature of the air-conditioning space 110 above 72° F. As a result, the IACU 130 must operate to further cool the air in the air-conditioning space 110 to keep it at 72° F.

The total amount of energy expended by the OACU 120 and the IACU 130 is represented by the total volume of the first and fourth cooling loads 510, 730, and the first heating load 520, i.e., A+(A−B)+(D−B)=A+(A−D)+2(D−B) [Substituting A=(A−D)+D]. As shown in FIG. 7, however, energy (D−B) is being expended twice, once to heat the air after it is dehumidified, and once to cool the air after it is heated. This is wasted energy, which should be minimized. Ideally, the dehumidified air should only be heated as much as necessary to obtain a desired target temperature $T_T$ in the air-conditioning space 110.

Figure 8:
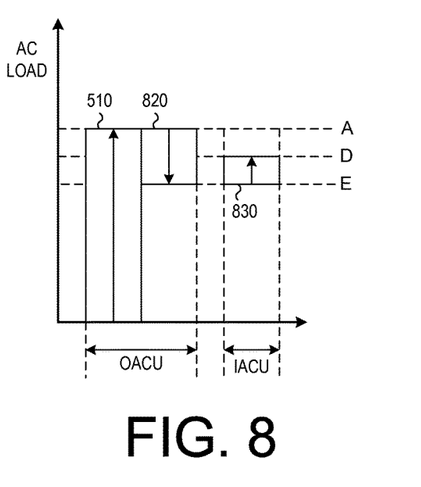
FIG. 8 is a graph of the load of the outside air conditioning unit and an inside air conditioning unit of FIG. 1 according to still another disclosed embodiment.

FIG. 8 is a graph of the load of the outside air conditioning unit (OACU) 120 and an inside air conditioning unit (IACU) 130 of FIG. 1 according to still another disclosed embodiment. As with FIG. 5, for the sake of simplicity, this graph will consider the case of controlling the temperature in a single air-conditioning space 110 with a single IACU 130 in the structure associated with the OACU 120. However, it can easily be extended to address the total load in multiple air-conditioning spaces 110 in a structure.

As shown in FIG. 8, the OACU 120 has a first cooling air conditioning load 510 and a second heating air conditioning load 820, while the IACU 130 has a fifth cooling air conditioning load 830. As with FIG. 5, loads with an arrow pointing up represent cooling air conditioning loads, while loads with an arrow pointing down represent heating air conditioning loads.

As in FIG. 5, the first cooling air conditioning load 510 represents the energy A required for the OACU 120 to cool outdoor air from an outdoor temperature $T_O$ to a dehumidified temperature $T_D$. This dehumidified air at the dehumidified temperature $T_D$ is provided directly to the air-conditioning space 110 as supply air. In other words the supply air temperature $T_S$ is equal to the dehumidified temperature $T_D$.

In this embodiment, the temperature required to maintain the air-conditioning space 110 at a desired target temperature $T_T$ is higher than the dehumidification temperature $T_D$. As a result, the dehumidified air must be heated to provide indoor air that can maintain the desired target temperature $T_T$.

The second heating air conditioning load 820 represents the energy (A−E) required for the OACU 120 to heat the dehumidified air from the dehumidified temperature $T_D$ to a supply air temperature $T_S$ that is lower than the desired target temperature $T_T$ of the air-conditioning space 110. However, because of environmental conditions in the air-conditioning space 110 the indoor air will still be too warm if the supply air temperature $T_S$ is equal this lower temperature.

The fifth cooling air conditioning load 830 represents the energy (D−E) required for the IACU 130 to cool the indoor air to keep it at the desired target temperature $T_T$.

Consider, for example, if the dehumidified temperature $T_D$ is 55° F., and the desired target temperature $T_T$ is 72° F. In this example, the supply air is provided at a supply air temperature $T_S$ that is lower than the desired target temperature $T_T$, e.g., it is provided at 65° F. However, the air conditioning load in the air-conditioning space 110 is still high enough that even if supply air is provided to the air-conditioning space 110 at 65° F., the sources of heat operating on the air-conditioning space 110 will raise the temperature of the air-conditioning space 110 above 72° F. As a result, the IACU 130 must operate to further cool the air in the air-conditioning space 110 to keep it at 72° F.

The total amount of energy expended by the OACU 120 and the IACU 130 is represented by the total volume of the first and fifth cooling loads 510, 830, and the second heating load 820, i.e., A+(A−E)+(D−E)=A+(A−D)+2(D−E) [Substituting A=(A−D)+D]. As shown in FIG. 7, however, energy (D−E) is being expended twice, once to heat the air after it is dehumidified, and once to cool the air after it is heated. Again, this is wasted energy, which should be minimized. However, in comparison with the embodiment of FIG. 7, the embodiment of FIG. 8 reduces the amount of wasted energy by reducing the amount of heating of the dehumidified air by the heater 220 in the OACU 120, i.e., reducing the first heating air conditioning load 520 to the second heating air conditioning load 820.

Figure 9:
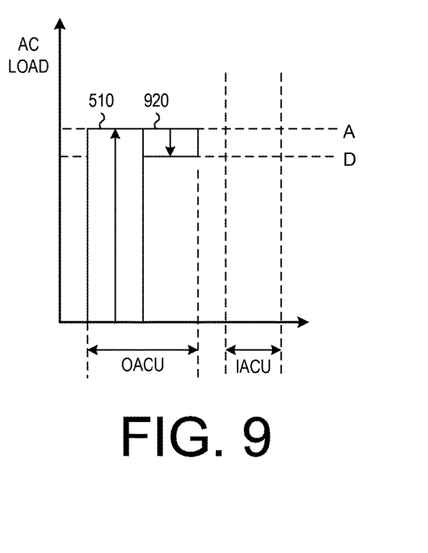
FIG. 9 is a graph of the load of the outside air conditioning unit and an inside air conditioning unit of FIG. 1 according to yet another disclosed embodiment.

FIG. 9 is a graph of the load of the outside air conditioning unit (OACU) 120 and an inside air conditioning unit (IACU) 130 of FIG. 1 according to yet another disclosed embodiment. In this embodiment the outside air is warm and humid, requiring dehumidification, and there is a smaller air conditioning load in the air-conditioning space 110 associated with the IACU 130 then in FIG. 6. As with FIG. 5, for the sake of simplicity, this graph will consider the case of controlling the temperature in a single air-conditioning space 110 with a single IACU 130 in the structure associated with the OACU 120. However, it can easily be extended to address the total load in multiple air-conditioning spaces 110 in a structure.

In this embodiment, the supply air temperature $T_S$ required to maintain the relevant air-conditioning space 110 at its desired target temperature $T_T$ is higher than the dehumidified temperature $T_D$.

As shown in FIG. 9, the OACU 120 has a first cooling air conditioning load 510 and a third heating air conditioning load 920, while at the IACU 130 has no air conditioning load. In this graph, loads with an arrow pointing up represent cooling air conditioning loads, while loads with an arrow pointing down represent heating air conditioning loads.

As in FIG. 5, the first cooling air conditioning load 510 represents the energy A required for the OACU 120 to cool outdoor air from an outdoor temperature $T_O$ to a dehumidified temperature $T_D$.

The third heating air conditioning load 920 represents the energy (A−D) required for the OACU 120 to heat the dehumidified air from the dehumidified temperature $T_D$ to a supply temperature $T_S$ appropriate to maintain the air-conditioning space 110 at the desired target temperature $T_T$. In this embodiment, the required supply temperature $T_S$ is higher than the dehumidified temperature $T_D$.

In this case, there may still be an air conditioning load in the air-conditioning space 110. If this is so, the supply temperature $T_S$ will be lower than the desired target temperature $T_T$. The temperature differential between the supply temperature $T_S$ and the desired target temperature $T_T$ is used to overcome the air conditioning load in the air-conditioning space 110. However, the air conditioning load in the air-conditioning space 110 is small enough that it can be overcome by a temperature above the dehumidified temperature $T_D$.

Consider, for example, if the dehumidified temperature $T_D$ is 55° F., and the desired target temperature $T_T$ is 72° F. In this example, the air conditioning load in the air-conditioning space 110 is such that the supply air must be provided at a temperature between 55° F. and 72° F. (e.g., 60° F.) in order to maintain the air-conditioning space 110 at the desired target temperature of 72° F. As a result, the OACU 120 must operate to warm the dehumidified air before it is provided as supply air. Because the OACU is able to provide supply air at the appropriate temperature, there is no need for the IACU 130 to operate at all. In particular, the IACU 130 does not need to cool the supply air that has been warmed by the heater in the OACU 120, and therefore no energy is wasted.

The total amount of energy expended by the OACU 120 and the IACU 130 is represented by the total volume of the first cooling load 510 and the third heating load 920, i.e., A+(A−D). As shown in FIG. 9, the IACU 130 does not operate to cool air that has been heated by the OACU 120. As a result, no energy is wasted by the air-conditioning system 100.

Thus, by operating the OACU 120 and the IACU 130 as shown above in FIGS. 6 and 9, the total energy used by the air-conditioning system 100 is minimized.

Operation of the Air Conditioning System

Figure 10:
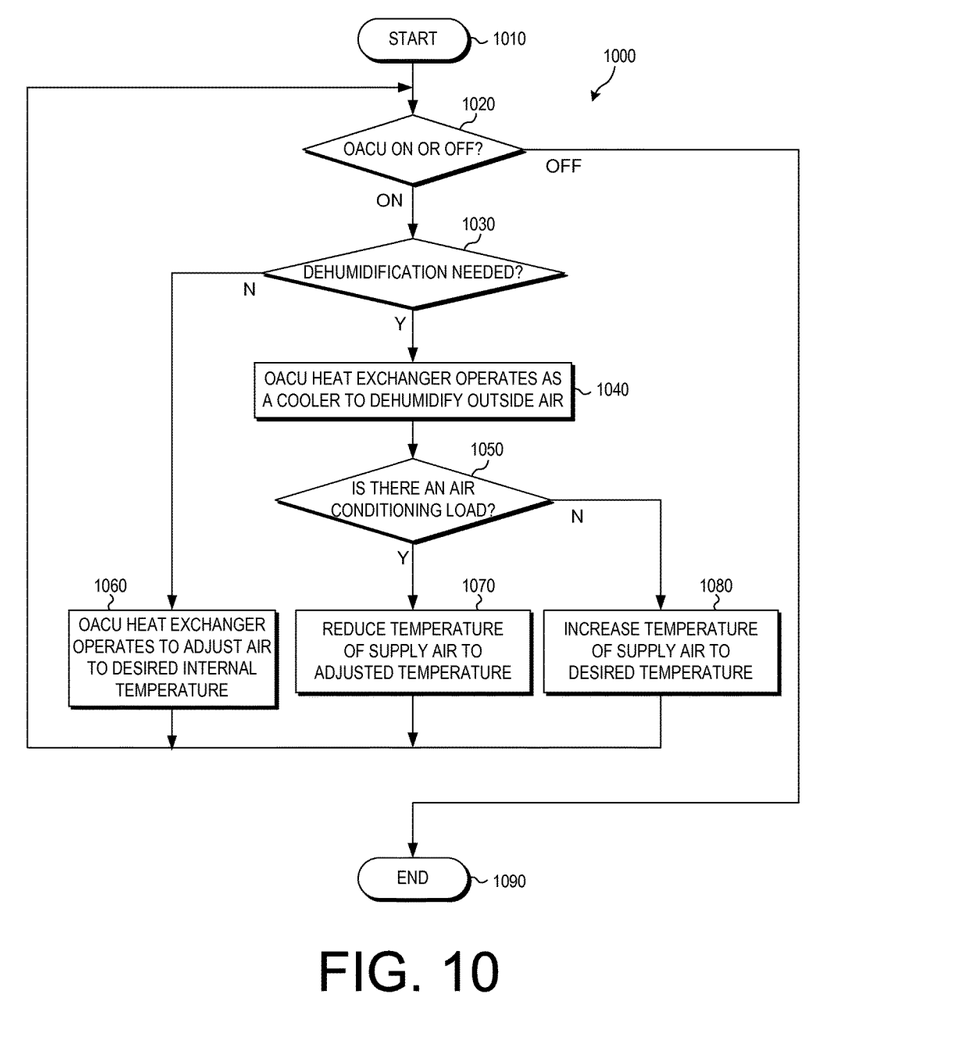
FIG. 10 is a flow chart of the operation of the air conditioning system of FIG. 1 according to a disclosed embodiment.

FIG. 10 is a flow chart of the operation of the air conditioning system of FIG. 1 according to a disclosed embodiment.

As shown in FIG. 10 once the operation starts (1010) a controller (e.g., the control module 140) determines whether or not an OACU 120 is on or off (1020). In other words, it determines whether the OACU 120 is operating to condition outdoor air into supply air to be provided to a plurality of air-conditioning spaces 110.

If it is determined that the OACU 120 is off, then processing ends (1090). However, if the OACU 120 is on, the controller determines whether dehumidification is needed (1030). In other words, the controller determines whether the outside air is humid enough that it must have moisture removed from it before it is provided as supply air.

If no dehumidification is required, then the OACU 120 operates to adjust outdoor air to a desired supply air temperature (1060), which can be provided to one or more air-conditioning spaces 110. Processing then returns to a determination of whether the OACU 120 is on or off (1020).

If dehumidification is required, then the OACU 120 operates first as a cooler to dehumidify the outside air (1040). In particular, the OACU heat exchanger 210 cools the outdoor air from an outdoor temperature $T_O$ to a dehumidified temperature $T_D$ to remove moisture from the outside air and to form dehumidified air.

After the OACU 120 cools the outdoor air into dehumidified air, the controller determines if there is an air conditioning load in an air-conditioning space 110 to which the supply air will be supplied (1050). In other words, the controller determines whether there is any reason that an IACU 130 would have to further cool indoor air in the air-conditioning space 110 if the supply air temperature $T_S$ were at the desired target temperature $T_T$.

If it is determined that there is an air conditioning load in the air-conditioning space 110, then the controller will change the temperature of the supply air $T_S$ to an adjusted temperature $T_A$ that is lower than a desired target temperature $T_T$ (1070). It will do this by lowering the heating capacity of the heater 220 in the OACU 120 from a desired heating capacity down to an adjusted heating capacity. This will lower the supply temperature $T_S$ of the supply air down to the adjusted temperature $T_A$ by heating the dehumidified air at less than the amount required to obtain the desired target temperature $T_T$. Thus, the supply temperature $T_S$ will be warmer than the dehumidified temperature $T_D$, but cooler than the desired target temperature $T_T$ in an effort to overcome some of the air conditioning load.

The desired heating capacity can be set at any level above the adjusted heating capacity, up to 100% heating capacity. In many embodiments, the desired heating load will be 100% heating capacity i.e., having the heater 220 fully on. In other embodiments, the desired heating capacity can be below 100%.

The adjusted heating capacity can be set at any level that is lower than the desired heating capacity, down to 0% heating capacity. In various embodiments, the adjusted heating capacity is set to provide a supply air temperature $T_S$ at a desired target temperature $T_T$. Alternate embodiments can set the adjusted heating capacity to provide a supply air temperature $T_S$ at a conditioned temperature $T_C$ of the conditioned air provided by an IACU in an associated air-conditioning space 110.

After the heating load of the heater 220 is lowered, processing then returns to a determination of whether the OACU 120 is on or off (1020).

If, however, it is determined that there is no air conditioning load, then the controller raises the heating capacity of the heater 220 in the OACU 120 to the desired heating capacity for a time to heat the dehumidified air into supply air (1080).

After the heater is turned off, processing then returns to a determination of whether the OACU 120 is on or off (1020).

In this way, the heater 220 in the OACU 120 is only operated at the desired capacity when it would not cause an IACU 130 to have to cool air that has been heated by the OACU 120. Ideally, this would either cause the supply air temperature $T_S$ to be heated to exactly what was needed to maintain the desired target temperature $T_T$ of the air-conditioning space 110, or cause the supply air temperature $T_S$ to be higher than what is needed to maintain the desired target temperature $T_T$.

Setting the adjusted heating capacity is more complicated when the OACU 120 supplies air to multiple air-conditioning spaces 110. In such case, there are numerous ways to determine an adjusted heating capacity/adjusted temperature. For example, the adjusted heating capacity could be the heating capacity sufficient to make the supply air temperature $T_S$: equal to the highest desired target temperature $T_T$ in the multiple air-conditioning spaces 110; equal to the highest desired target temperature $T_T$ in the plurality of air-conditioning units 110, modified by a correction value (i.e., $T_T \pm A$); equal to an average temperature $T_A$ of the desired target temperatures $T_T$ for the plurality of air-conditioning units 110; equal to an average desired target temperature $T_A$, modified by correction value (i.e., $T_A \pm A$); or equal to a highest conditioned temperature $T_C$ of the conditioned air provided by the plurality of IACUs 130. Alternate values for the adjusted heating capacity/adjusted temperature are, of course, possible in alternate embodiments.

Figure 11:
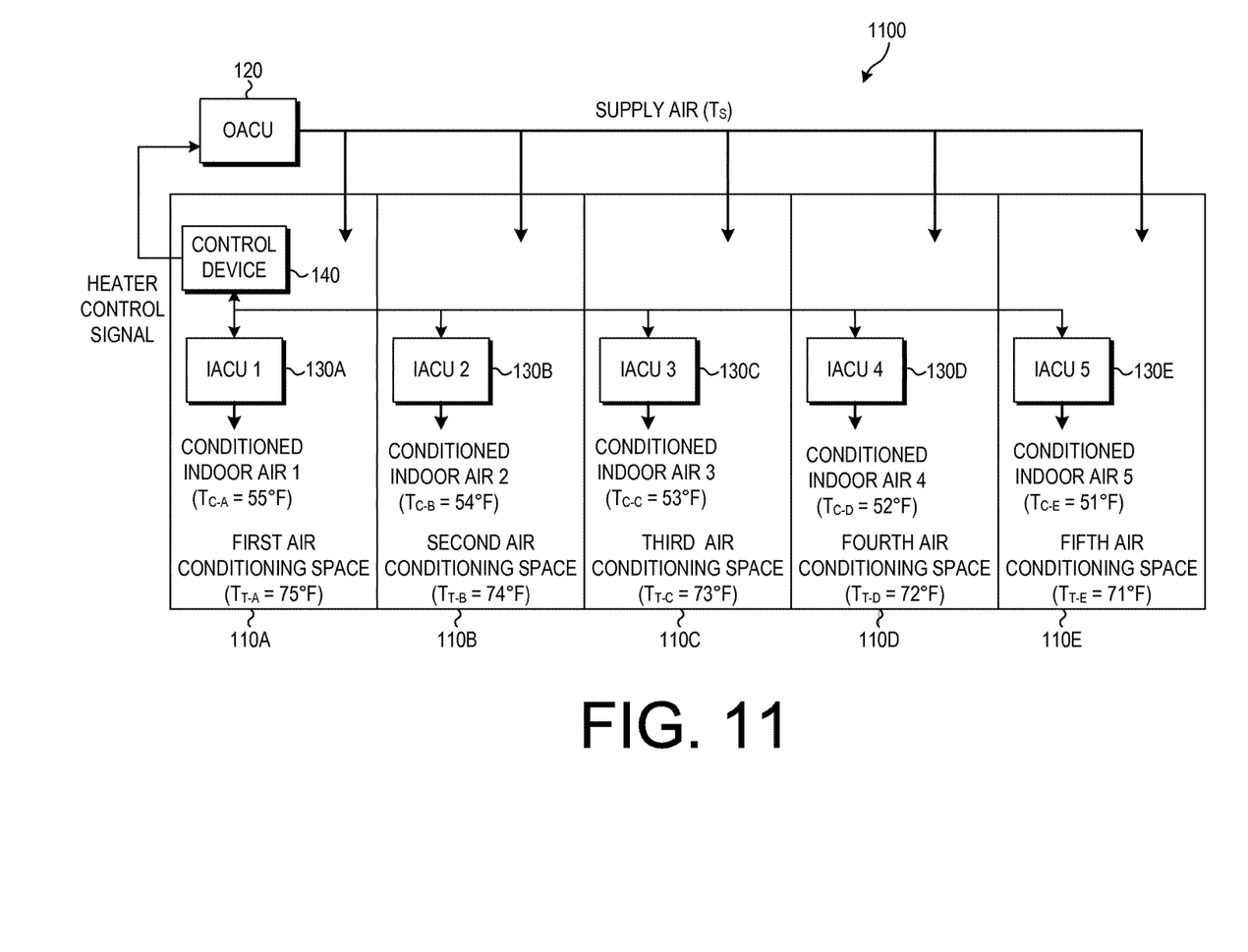
FIG. 11 is a block diagram showing an air-conditioning system that includes a plurality of air-conditioning spaces according to disclosed embodiments.

FIG. 11 is a block diagram showing an air-conditioning system 1100 that includes a plurality of air-conditioning spaces 110A-110E according to a disclosed embodiment. As shown in FIG. 11, an OACU 120 provides supply air at a supply air temperature $T_S$ to each of the plurality of air-conditioning spaces 110A-110E. A plurality of IACUs 130A-130E are provided, one in each of the plurality of air-conditioning spaces 110A-110E. Each of these IACU's 130A-130E operates to heat or cool the supply air to a corresponding conditioned air temperature $T_{C-A}$-$T_{C-E}$, as needed, to obtain the corresponding desired target temperature $T_{T-A}$-$T_{T-E}$. A control device 140 controls the operation of the OACU 120 and each of the IACUs 130A-130E.

In the embodiment of FIG. 11, the first air-conditioning space 110A has a first desired target temperature $T_{T-A}$ equal to 75° F., and a first IACU 130A in the first air-conditioning space 110A provides conditioned air at a first conditioned air temperature $T_{C-A}$ equal to 55° F. The second air-conditioning space 110B has a second desired target temperature $T_{T-B}$ equal to 74° F., and a second IACU 130B in the second air-conditioning space 110B provides conditioned air at a second conditioned air temperature $T_{C-B}$ equal to 54° F. The third air-conditioning space 110C has a third desired target temperature $T_{T-C}$ equal to 73° F., and a third IACU 130C in the third air-conditioning space 110C provides conditioned air at a third conditioned air temperature $T_{C-C}$ equal to 53° F. The fourth air-conditioning space 110D has a fourth desired target temperature $T_{T-D}$ equal to 72° F., and a fourth IACU 130D in the fourth air-conditioning space 110D provides conditioned air at a fourth conditioned air temperature $T_{C-D}$ equal to 52° F. The fifth air-conditioning space 110E has a fifth desired target temperature $T_{T-E}$ equal to 71° F., and a fifth IACU 130E in the fifth air-conditioning space 110E provides conditioned air at a fifth conditioned air temperature $T_{C-E}$ equal to 51° F.

Under various embodiments, the adjusted temperature $T_A$ could be set to be equal to the highest desired target temperature $T_T$ among the first through fifth air-conditioning spaces 110A-110E (i.e., 75° F.); the average desired target temperature $T_T$ among the first through fifth air-conditioning spaces 110A-110E (i.e., 73° F.); the lowest desired target temperature $T_T$ among the first through fifth air-conditioning spaces 110A-110E (i.e., 71° F.); the highest, average, or lowest desired target temperature $T_T$, modified by an adjustment factor A (i.e., 75° F.±A, 73° F.±A, or 71° F.±A); the highest conditioned air temperature $T_C$ among the first through fifth air-conditioning spaces 110A-110E (i.e., 55° F.); the highest conditioned air temperature $T_C$ modified by an adjustment factor A (i.e., 55° F.±A); or any suitable temperature lower than the desired temperature. The adjusted heating capacity will be the heating capacity required to obtain the adjusted temperature $T_A$. In this embodiment, the adjustment factor A could be, for example, 1-3° F., or any suitable temperature increment.

Furthermore, the determination of whether there is an air conditioning load in a given air-conditioning space 110 becomes more difficult when an OACU 120 is connected to multiple air-conditioning spaces 110, which may have different desired target temperatures $T_T$, and different air conditioning loads. For example, with respect to the embodiment of FIG. 1, if a first air-conditioning space 110A has a desired target temperature $T_T$ of 70° and a second air-conditioning space 110B has a desired target temperature $T_T$ of 75°, it is possible that the first air-conditioning space 110A will have an air conditioning load, while the second air-conditioning space 110B will not. Likewise, if the first air-conditioning space 110A is on a sunny side of the building, while the second air-conditioning space 110B is on a shady side of the building, it is also possible that the first air-conditioning space 110A will have an air conditioning load, while the second air-conditioning space 110B will not. Thus, it can be difficult to answer the simple question of whether there is an air conditioning load.

One way to solve this problem is to set a threshold number of air-conditioning spaces 110 for the determination of whether there is an air conditioning load. If a set number of air-conditioning spaces 110 have an air conditioning load, then the group of air-conditioning spaces 110 will be considered to have an air conditioning load. Likewise, if fewer than the set number of air-conditioning spaces 110 have an air conditioning load, then the group of air-conditioning spaces 110 will not be considered to have an air conditioning load.

Furthermore, the exact determination of whether there is an air conditioning load can be determined in a large number of ways, as noted above with respect to FIG. 4. One way of determining whether there is an air conditioning load is to identify whether an IACU 130 is operating. If the IACU 130 is operating to cool the air, then there is an air conditioning load in a corresponding air-conditioning space 110; and if the IACU 130 is not operating to cool the air, then there is no air conditioning load in the corresponding air-conditioning space 110.

Combining this method of estimation with the set threshold, it is possible to determine whether a group of air-conditioning spaces 110 have an air conditioning load by determining whether a set number of IACUs 130 are operating in a cooling mode. If the set number or more of the IACUs 130 are operating in a cooling mode, then the group of air-conditioning spaces 110 can be considered to have an air conditioning load. If, however, fewer than the set number of IACUs 130 are operating in a cooling mode, then the group of air-conditioning spaces can be considered to not have an air conditioning load.

The set threshold can set any desirable number, e.g., one IACU 130, one-third of the total IACUs 130, half of the total IACUs 130, two-thirds of the total IACUs 130, all of the total IACUs 130, or any other suitable threshold.

Figure 12:
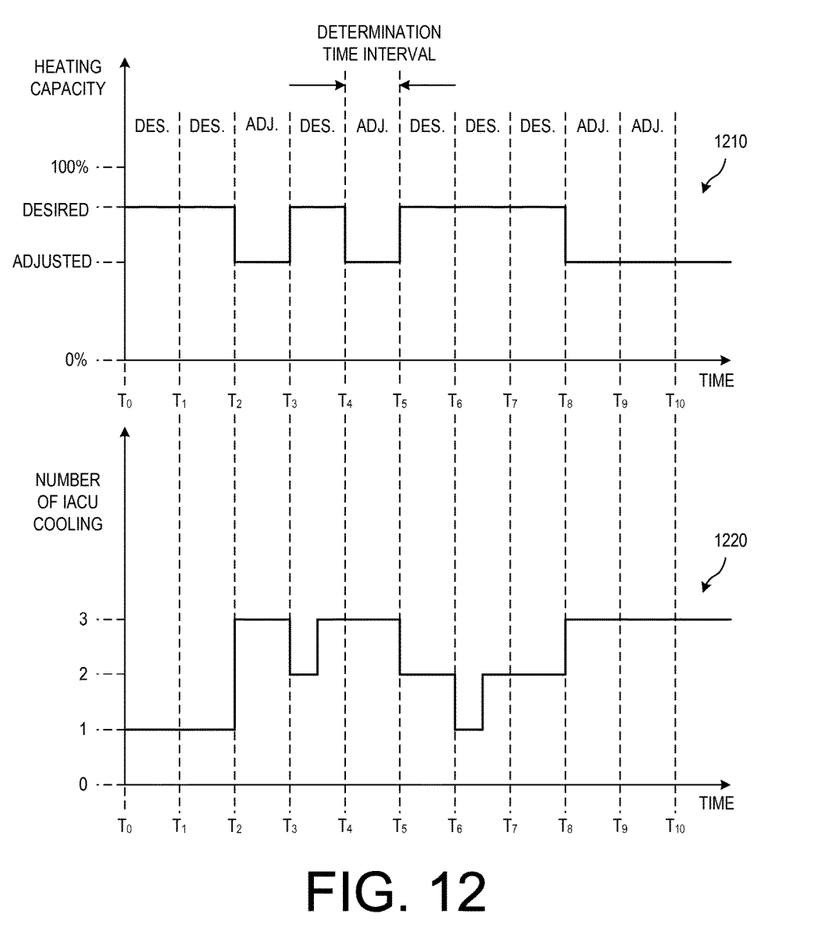
FIG. 12 is a graph showing the heating capacity of a heater in an outdoor air conditioning unit compared to a number of internal air conditioning units operating in a cooling capacity according to disclosed embodiments.

FIG. 12 is a graph showing the heating capacity of a heater 220 in an outdoor air conditioning unit (OACU) 120 compared to a number of internal air conditioning units (IACUs) 130 operating in a cooling capacity according to disclosed embodiments. In particular, FIG. 12 shows a first graph 1210 of heating capacity versus time for the heater 220 and an outdoor OACU 120, and a second graph 1220 of the number of IACUs 130 operating in a cooling mode versus time for the air-conditioning system 100.

The embodiment of FIG. 12 applies to the air conditioning system 100 of FIG. 1, in which there are three air-conditioning spaces 110A-110C, including three IACUs 130A-130C, respectively. In this embodiment, the threshold for considering whether the air conditioning system 100, as a whole, has an air conditioning load is whether all three of the IACUs 130A-130C are in operation. In other words, if all three IACUs 130A-130C are operating in a cooling mode, the air-conditioning system 100 is considered to have an air conditioning load, while if two or fewer of the IACUs 130A-130C are operating in a cooling mode, then the air-conditioning system 100 is considered to not have an air conditioning load.

As shown in FIG. 12, a determination as to whether the air-conditioning system 100 has an air conditioning load is made every determination time interval, starting at time $T_0$, and extending through time $T_{10}$. The system starts at a default of a desired heating capacity at time $T_0$, when only one IACU 130 is in operation.

At time $T_1$, the control module 140 determines that only one IACU 130 is operating. As a result the heating capacity of the heater 220 in the OACU 120 remains at the desired level.

At time $T_2$, the number of IACUs 130 operating in a cooling mode rises to three. This meets the required threshold, causing the heating capacity of the heater 220 to drop to the adjusted level.

At time $T_3$, the number of IACUs 130 operating in a cooling mode drops two. This falls below the required threshold, and causes the heating capacity of the heater 220 to rise back to the desired level.

Halfway between time $T_3$ and $T_4$, the number of IACUs 130 operating in a cooling mode rises back to three. This meets the required threshold to cause the heating capacity of the heater 220 to drop to the adjusted level. However, since this is between the ends of the determination time interval, no change occurs. It is only at time $T_4$, when the number of IACUs 130 operating in a cooling mode remains at three that the heating capacity of the heater 220 actually drops to the adjusted level.

At time $T_5$, the number of IACUs 130 operating in a cooling mode drops to two again. This falls below the required threshold, and causes the heating capacity of the heater 220 to rise back to the desired level.

At time $T_6$, the number of IACUs 130 operating in a cooling mode drops to one. However, since this remains below the required threshold, the heating capacity of the heater 220 remains at the desired level.

Between times $T_6$ and $T_7$, the number of IACUs 130 operating in a cooling mode rises to two. Again, this is between the ends of a determination time interval, so no actual determination of whether a load exists is made. It is only at time $T_7$, when the number of IACUs 130 operating in a cooling mode remains at two that this determination is made. Since the number of IACUs 130 operating in a cooling mode remains below the required threshold, the heating capacity of the heater 220 remains at the desired level.

At time $T_8$, the number of IACUs 130 operating in a cooling mode rises to three again. This meets the required threshold, and causes the heating capacity of the heater 220 to drop to the adjusted level again.

At times $T_9$ and $T_{10}$, the number of IACUs 130 operating in a cooling mode remains at three. This continues to meet the required threshold and causes the heating capacity of the heater 220 to remain at the adjusted level.

As the number of IACUs 130 operating in a cooling mode rises and falls, the heating capacity of the heater 220 will change, as necessary. However, this is merely one way of determining whether the air conditioning system 100 has an air conditioning load. In alternate embodiments different determinations can be made. For example, the determination as to whether or not there is an air conditioning load can be based, in whole or in part, on time of day, time of year, outdoor temperature, indoor temperature in the air-conditioning spaces 110, solar radiation incident upon the air-conditioning spaces 110, or the structure as a whole, the population in each of the air-conditioning spaces 110, the supply air temperature, the energy consumption of the air-conditioning system 100, or any other desired criteria.

CONCLUSION

This disclosure is intended to explain how to fashion and use various embodiments in accordance with the invention rather than to limit the true, intended, and fair scope and spirit thereof. The foregoing description is not intended to be exhaustive or to limit the invention to the precise form disclosed. Modifications or variations are possible in light of the above teachings. The embodiment(s) was chosen and described to provide the best illustration of the principles of the invention and its practical application, and to enable one of ordinary skill in the art to utilize the invention in various embodiments and with various modifications as are suited to the particular use contemplated. All such modifications and variations are within the scope of the invention as determined by the appended claims, as may be amended during the pendency of this application for patent, and all equivalents thereof, when interpreted in accordance with the breadth to which they are fairly, legally, and equitably entitled. The various circuits described above can be implemented in discrete circuits or integrated circuits, as desired by implementation.

What is claimed is:

1. An air conditioning system, comprising:
    an outdoor air conditioner provided outside a structure, configured to cool outdoor air at an outdoor temperature into dehumidified air at a dehumidified temperature, configured to heat the dehumidified air to a supply air temperature, and configured to provide the dehumidified air as supply air to a plurality of air-conditioning spaces inside the structure;
    a plurality of indoor air conditioners provided inside the plurality of air-conditioning spaces, respectively, each of the plurality of indoor air conditioners being configured to draw in input air from a corresponding air-conditioning space at an input temperature, configured to heat or cool the input air to an output temperature, and configured to provide the input air as output air to the corresponding air-conditioning space; and
    a control circuit configured to individually determine whether an air conditioning load exists in each of the plurality of air conditioning spaces, determine whether a number of the plurality of air-conditioning spaces for which an air conditioning load exists is greater than a set threshold, and to adjust operation of the outdoor air conditioner to set the supply air temperature based on whether the number of the plurality of air conditioning spaces for which an air conditioning load exists is greater than the set threshold.

2. The air conditioning system of claim 1, wherein the control circuit is further configured to set the supply air temperature to either a maximum temperature or an adjusted temperature.

3. The air conditioning system of claim 1, wherein the adjusted temperature is the dehumidification temperature.

4. The air conditioning system of claim 1, wherein
    a plurality of desired temperatures are set for the plurality of air-conditioning spaces, respectively, and
    the adjusted temperature is a highest temperature of the plurality of desired temperatures.

5. The air conditioning system of claim 1, wherein
    a plurality of desired temperatures are set for the plurality of air-conditioning spaces, respectively, and
    the adjusted temperature is a highest temperature of the plurality of desired temperatures modified by an adjustment value.

6. The air conditioning system of claim 1, wherein
    a plurality of desired temperatures are set for the plurality of air-conditioning spaces, respectively, and
    the adjusted temperature is an average temperature of the plurality of desired temperatures.

7. The air conditioning system of claim 1, wherein
    a plurality of desired temperatures are set for the plurality of air-conditioning spaces, respectively, and
    the adjusted temperature is an average temperature of the plurality of desired temperatures modified by an adjustment value.

8. The air conditioning system of claim 1, wherein
    a plurality of desired temperatures are set for the plurality of air-conditioning spaces, respectively, and
    the adjusted temperature is a median temperature of the plurality of desired temperatures.

9. The air conditioning system of claim 1, wherein the maximum temperature is a highest temperature of the plurality of output temperatures.

10. The air conditioning system of claim 1, wherein the set number of the plurality of indoor air conditioners is all of the plurality of indoor air conditioners.

11. The air conditioning system of claim 1, wherein the input air is the supply air, and the output air is indoor air.

12. The air conditioning system of claim 1, wherein the input air is indoor air from the indoor air-conditioning space, and the output air is conditioned indoor air.

13. The air conditioning system of claim 1, wherein
    the control circuit further comprises an indoor air conditioner operation sensor configured to determine whether the set number of the indoor air conditioners are currently operating, and
    the control circuit is further configured to determine whether the air conditioning load exists based on whether the indoor air conditioner operation sensor determines that the set number of the indoor air conditioners are currently operating.

14. The air conditioning system of claim 1, wherein
    the control circuit further comprises a solar radiation sensor configured to detect an amount of solar radiation incident on the structure, and
    the control circuit is further configured to determine whether the air conditioning load exists based on whether the detected amount of solar radiation exceeds a solar radiation threshold.

15. The air conditioning system of claim 1, wherein
the control circuit further comprises an energy consumption sensor configured to detect an energy consumption of the air conditioning system, and
the control circuit is further configured to determine whether the air conditioning load exists based on whether the detected energy consumption exceeds an energy consumption threshold.

16. The air conditioning system of claim 1, wherein
the control circuit further comprises a clock configured to determine a current time of day, and
the control circuit is further configured to determine whether the air conditioning load exists based on whether the current time of day falls within a set time range.

17. The air conditioning system of claim 1, wherein
the control circuit further comprises a calendar circuit configured to determine a current date, and
the control circuit is further configured to determine whether the air conditioning load exists based on whether the current date falls within a set date range.

18. The air conditioning system of claim 1, wherein
the control circuit further comprises an outdoor temperature sensor configured to detect the outdoor temperature, and
the control circuit is further configured to determine whether the air conditioning load exists based on whether the outdoor temperature is above an outdoor temperature threshold.

19. The air conditioning system of claim 1, further comprising
a solar radiation sensor configured to detect an amount of solar radiation incident upon a selected one of the plurality of air-conditioning spaces,
wherein
the control circuit is further configured to determine whether the air conditioning load exists in the selected one of the plurality of air-conditioning spaces based on the detected amount of solar radiation incident upon the selected one of the plurality of air-conditioning spaces.

20. The air conditioning system of claim 1, further comprising
an air conditioning area population sensor configured to detect an actual or approximate number of people in a selected one of the plurality of air-conditioning spaces,
wherein
the control circuit is further configured to determine whether the air conditioning load exists in the selected one of the plurality of air-conditioning spaces based on the detected actual or approximate number of people in the selected one of the plurality of air-conditioning spaces.

21. The air conditioning system of claim 1, further comprising
an indoor air-conditioner operation sensor configured to detect whether a selected one of the plurality of indoor air conditioners are currently operating to heat or cool the input air in a selected one of the plurality of air-conditioning spaces,
wherein
the control circuit is further configured to determine whether the air conditioning load exists in the selected one of the plurality of air-conditioning spaces based on whether the selected one of the plurality of indoor air conditioners is currently operating to heat or cool the input air in the selected one of the plurality of air-conditioning spaces.

22. The air conditioning system of claim 1, further comprising
an outdoor temperature sensor configured to detect an outdoor temperature of the air outside the structure,
wherein
the control circuit is further configured to determine whether the air conditioning load exists in one of the plurality of air-conditioning spaces based on the outdoor temperature of the air outside the structure.

* * * * *